US012014094B2

United States Patent
Hosomizo

(10) Patent No.: US 12,014,094 B2
(45) Date of Patent: Jun. 18, 2024

(54) SUPPORT PROGRAM, INFORMATION PROCESSING DEVICE, AND PRINTING METHOD

(71) Applicant: BROTHER KOGYO KABUSHIKI KAISHA, Nagoya (JP)

(72) Inventor: Yoshito Hosomizo, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/215,216

(22) Filed: Mar. 29, 2021

(65) Prior Publication Data

US 2021/0216256 A1 Jul. 15, 2021

Related U.S. Application Data

(63) Continuation of application No. PCT/JP2020/025804, filed on Jul. 1, 2020.

(30) Foreign Application Priority Data

Dec. 12, 2019 (JP) .................................. 2019-224713

(51) Int. Cl.
*G06F 3/12* (2006.01)
*G06K 15/02* (2006.01)

(52) U.S. Cl.
CPC .......... *G06F 3/1219* (2013.01); *G06F 3/1229* (2013.01); *G06F 3/1257* (2013.01); *G06K 15/1836* (2013.01)

(58) Field of Classification Search
CPC .... G06F 3/1219; G06F 3/1229; G06F 3/1257; G06F 3/1285; G06F 3/1228; G06F 3/1247; G06K 15/1836; G03G 21/00
See application file for complete search history.

(56) References Cited

U.S. PATENT DOCUMENTS

2006/0279759 A1\* 12/2006 Choi ..................... G06F 3/1254
358/1.13
2011/0141505 A1 6/2011 Haga
(Continued)

FOREIGN PATENT DOCUMENTS

JP 2008-204169 A 9/2008
JP 2011-146016 A 7/2011
(Continued)

OTHER PUBLICATIONS

International Search Report with translation and Written Opinion with partial translation dated Oct. 6, 2020 issued In PCT application No. PCT/JP2020/025804.
(Continued)

*Primary Examiner* — Huo Long Chen
(74) *Attorney, Agent, or Firm* — Scully, Scott, Murphy & Presser, P.C.

(57) ABSTRACT

A non-transitory computer readable medium stores a program causing a computer installed an information processing device to execute a process for supporting a printer connected to the information processing device. The process includes, in a case where a print instruction causing the printer to print an image is sent to a general-purpose print program pre-installed in an operating system of the information processing device, and in a job based on the print instruction, a saving mode is selected, acquiring intermediate image data corresponding to the image to be printed from the general-purpose print program, performing an adjustment for saving colorant for the acquired intermediate image data, and outputting print data which is generated by rasterizing the intermediate image data adjusted in the adjustment so that the print data is transmitted from the information processing device to the printer.

8 Claims, 7 Drawing Sheets

(56) References Cited

U.S. PATENT DOCUMENTS

| 2011/0157631 | A1* | 6/2011 | Tsutsumi | G06F 3/126 |
| | | | | 358/1.15 |
| 2011/0222083 | A1* | 9/2011 | Kuno | H04N 1/3935 |
| | | | | 358/1.9 |
| 2012/0062926 | A1* | 3/2012 | Takada | G06F 3/1205 |
| | | | | 358/1.13 |
| 2014/0126004 | A1* | 5/2014 | Miyahara | H04N 1/6061 |
| | | | | 358/1.9 |
| 2015/0016734 | A1* | 1/2015 | Igarashi | H04N 19/593 |
| | | | | 382/232 |
| 2015/0227821 | A1* | 8/2015 | Komazawa | G03G 15/5025 |
| | | | | 358/1.2 |
| 2016/0295068 | A1* | 10/2016 | Otake | G06F 3/1285 |
| 2017/0031637 | A1* | 2/2017 | Maeda | G16H 30/20 |
| 2017/0290071 | A1* | 10/2017 | Ito | H04W 76/14 |
| 2019/0303076 | A1 | 10/2019 | Kato | |
| 2020/0012459 | A1* | 1/2020 | Yamazaki | G06F 3/1256 |

FOREIGN PATENT DOCUMENTS

| JP | 2016-035658 A | 3/2016 |
| JP | 2019-175330 A | 10/2019 |

OTHER PUBLICATIONS

Notice of Reasons for Refusal dated Oct. 17, 2023 received in Japanese Patent Application No. JP 2019-224713.

* cited by examiner

SUPPORT PROGRAM, INFORMATION PROCESSING DEVICE, AND PRINTING METHOD

CROSS-REFERENCE TO RELATED APPLICATIONS

This is a continuation application of International Application No. PCT/JP2020/025804 filed on Jul. 1, 2020 which claims priority from Japanese Patent Application No. 2019-224713 filed on Dec. 12, 2019. The entire contents of the earlier applications are incorporated herein by reference.

TECHNICAL FIELD

The technical field disclosed in the present specification relates to a support program that supports printer control, an information processing device, and a printing method.

BACKGROUND ART

As a technique of controlling a printer from an information processing device including a personal computer, for example, as disclosed in JP-A-2011-146016, there is a known configuration in which a toner save setting is stored in a computer in advance, and when a print instruction is received, a printer driver is used to generate a print command based on the toner save setting, the print command is further transmitted to the printing device, and the printing device performs printing based on the print command.

In recent years, a technique of controlling a printer by a print program that is incorporated in an operating system (hereinafter, referred to as "OS") as a standard function without using the printer driver described above has been put into practical use. In this technique, when the OS associates the printer with the OS standard general-purpose print program when detecting the printer and subsequently receives a print instruction for the printer, it is possible to print using the OS standard general-purpose print program without using the printer driver.

However, in the printing by the OS standard general-purpose print program, selectable setting items are limited to generally registered item in the OS standard print program when the print parameters are selected. Therefore, the mode for saving the colorant used for printing may not be supported. In addition, it may not be possible to execute processing corresponding to toner save by failing to allocate sufficient memory for image conversion depending on the printer.

The present specification discloses a technique that enables a colorant used for printing to be saved in an information processing device having an OS standard general-purpose print program incorporated therein.

SUMMARY OF INVENTION

According to an aspect of the invention, a non-transitory computer readable medium stores a program causing a computer installed an information processing device to execute a process for supporting a printer connected to the information processing device. The process includes, in a case where a print instruction causing the printer to print an image is sent to a general-purpose print program pre-installed in an operating system of the information processing device, and in a job based on the print instruction, a saving mode for reducing a usage amount of a colorant is selected, acquiring intermediate image data corresponding to the image to be printed according to the print instruction from the general-purpose print program, performing an adjustment for reducing a usage amount of colorant for the acquired intermediate image data, and outputting print data which is generated by rasterizing the intermediate image data adjusted in the adjustment so that the print data is transmitted from the information processing device to the printer.

According to the support program disclosed in this specification, when the saving mode is selected in the print instruction to the general-purpose print program installed in the OS of the information processing device, the adjustment for reducing the usage amount of the colorant is performed on the intermediate image data corresponding to the image to be printed and thus, print data of the image in which the usage amount of the colorant is reduced is generated from the adjusted intermediate image data. By transmitting this print data to the printer, the amount of the colorant used in the printer becomes small. Therefore, it is possible to save the colorant used for printing even if a print instruction is for a general-purpose print program or a printer is not capable of executing toner save.

An information processing device having the above program incorporated therein, a computer-readable storage medium storing the program, and a printing method for realizing the function of the program are also novel and useful.

According to the technique disclosed in the present specification, a technique capable of saving a colorant used for printing is realized in an information processing device having an OS standard general-purpose print program incorporated therein.

DETAILED DESCRIPTION OF EMBODIMENTS

Hereinafter, a personal computer (hereinafter, referred to as a "PC") that uses the program of a first embodiment will be described in detail with reference to the accompanying drawings. This embodiment discloses an embodiment embodying a program executed by a PC connected to a printer having a printing function.

Figure 1:
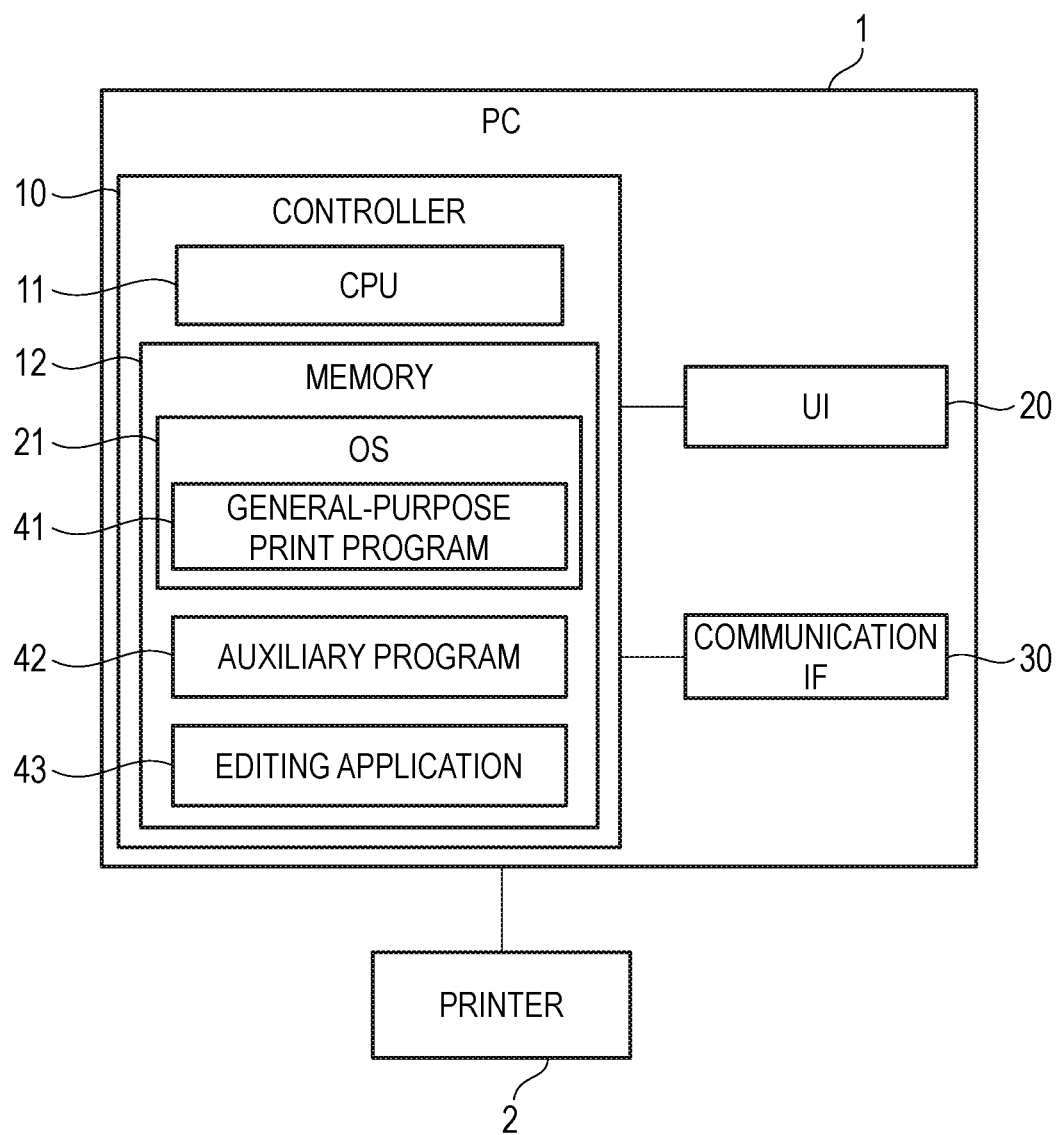
FIG. 1 is a block diagram showing the outline of an electric configuration of a PC.

A PC 1 of the present embodiment includes, for example, as shown in FIG. 1, a controller 10, a user interface (hereinafter referred to as "UI") 20, and a communication interface (hereinafter referred to as "communication IF") 30.

The UI 20 and the communication IF 30 are electrically connected to the controller 10, The PC 1 is an example of an information processing device. A printer 2 is a device having a printing function and is connected to the PC 1 via local communication or network communication.

The UI 20 includes hardware that performs various displays and receives an instruction input of a user.

The UI 20 may be a touch panel having both a display function and an input receiving function or may be a combination of a display having a display function and a keyboard or mouse having an input receiving function.

The communication 1F 30 includes hardware for communicating with an external device such as the printer 2 and hardware for accessing the Internet. The communication IF 30 may include a plurality of interfaces having different communication methods. Examples of communication methods include network communication and USB communication. Further, the communication may be wired communication or wireless communication.

The controller 10 includes a CPU 11 and a memory 12. The CPU 11 is an example of a computer. The memory 12 includes a ROM, a RAM, and a non-volatile memory and stores programs such as various application programs (hereinafter referred to as "applications") and various data. An example of the memory 12 may be a computer-readable storage medium. The CPU 11 executes various processes according to the program read from the memory 12 and based on the user's instruction. The controller 10 in FIG. 1 is a collective term for hardware and software used for controlling the PC 1 and does not necessarily represent a single piece of hardware actually existing in the PC 1.

For example, as shown in FIG. 1, the memory 12 stores an OS 21 including a general-purpose print program 41, an auxiliary program 42, and an editing application 43. The auxiliary program 42 is an example of a support program. The editing application 43 is an example of an application program. The OS 21 is, for example, Microsoft Windows (registered trademark), MacOS (registered trademark), or Linux (registered trademark). The memory 12 stores various data including information on the connected printer 2 and various programs including a browser in addition to the illustrated ones.

The general-purpose print program 41 is an OS standard program for executing printing with various printers including the printer 2 according to an instruction from the PC 1. The general-purpose print program 41 of the present embodiment is a program including a function of generating print data used by a corresponding printer for printing based on image data to be punted.

The general-purpose print program 41 supports a function that is configured to be commonly used by printers of a plurality of types of models provided by vendors of various printers. The general-purpose print program 41 does not support all the functions uniquely provided in various primers and the supported functions are limited to the general-purpose functions.

The auxiliary program 42 is a program or a program group that executes processing based on an instruction from the OS 21 accompanying the processing of the general-purpose print program 41 and is an application that supports the control of target hardware. The auxiliary program 42 of this embodiment supports the model of the printer 2 connected to the PC 1 and is activated from the general-purpose print program 41, for example, when the general-purpose print program 41 receives an instruction to cause the printer 2 to execute printing. The auxiliary program 42 is called, for example, a hardware support application (abbreviation: HSA).

The auxiliary program 42 receives a plurality of types of commands from the general-purpose print program 41 and executes various processes based on the received commands. The auxiliary program 42 is configured to execute respectively different processes depending on the content of the execution command from the general-purpose print program 41. The auxiliary program 42 may be a combination of a plurality of programs each of which receive an execution command or may be one program that is configured to execute different processes according to commands.

The auxiliary program may be a program prepared by the printer vendor for each printer type. For example, an auxiliary program may be for an inkjet printer or for a laser printer is prepared. The printer vendor registers the auxiliary program in the platform provided by the OS21 vendor according to the procedure specified by the OS21 vendor. When a printer is newly connected to the PC 1 and an auxiliary program corresponding to the printer is registered in the platform, the OS 21 downloads the auxiliary program from a server storing the auxiliary program and installs the auxiliary program in the PC 1. Then, the OS 21 stores the identification information of the installed auxiliary program in the memory 12 in association with the printer information of the newly connected printer. There may be an auxiliary program prepared not only for each printer type but for each printer model or each printer model series.

The editing application 43 is, for example, an application for creating and editing image data and document data. The editing application 43 may be Microsoft Word or PowerPoint. The editing application 43 may be an application provided by a vendor of the printer 2 or the like. The editing application 43 receives a user operation including an instruction to cause the printer 2 to perform a predetermined operation. Specifically, the editing application 43 receives, for example, a print instruction for causing the printer 2 to execute printing, via the UI 20.

The processing in the embodiment and each processing step in the flowchart basically indicate processing by the CPU 11 according to a command described in a program including the auxiliary program 42. The processing by the CPU 11 also includes hardware control using the API of the OS 21. In this specification, the operation of each program will be described by omitting the detailed description of the OS 21. Also, "acquisition" is used with a concept that a request is not essential.

Figure 2:
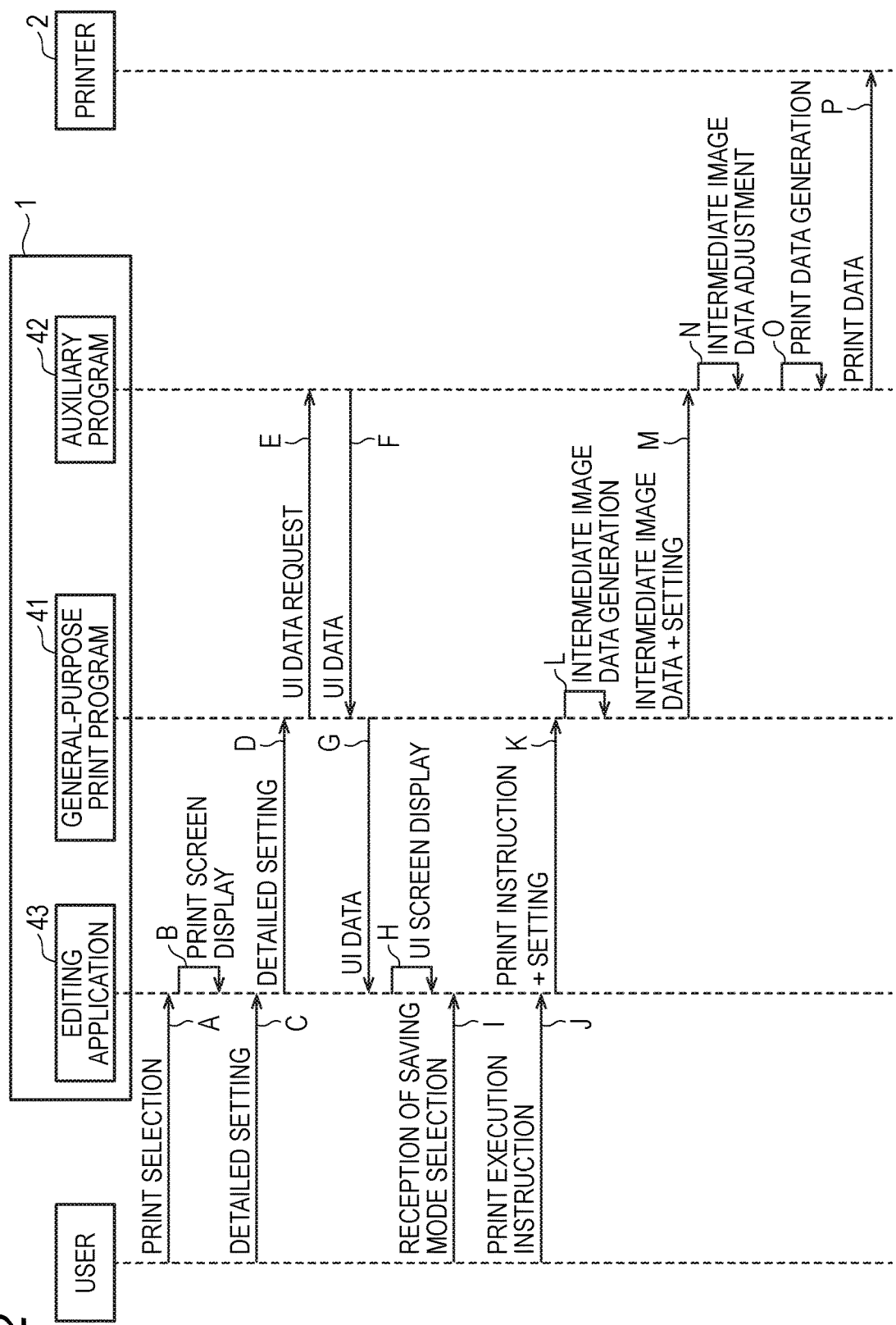
FIG. 2 is a sequence diagram illustrating an example of the procedure of the operation by each program.

Next, an example of the printing procedure including the operation of the auxiliary program 42 of the present embodiment will be described with reference to the sequence diagram of FIG. 2. FIG. 2 shows the operation when the editing application 43 receives a print instruction to cause the printer 2 to print using the general-purpose print program 41 and the auxiliary program 42 corresponding to the printer 2 is incorporated in the PC 1.

The application including the editing application 43 that receives the print instruction receives the selection of the printer and the selection of the print setting in the print instruction for printing using the general-purpose print program 41, When the editing application 43 of the present embodiment receives a user's instruction to start processing related to printing (arrow A), the editing application 43 displays a print screen that is a screen for receiving user's selection related to printing (arrow B).

On the print screen, the editing application 43 receives, for example, a selection of a printer, a selection of a print setting, a selection of a detailed setting, a selection of image data to be printed, and a print execution instruction. For example, when the editing application 43 receives an instruction to display a printer list for selecting a printer, the editing application 43 acquires list information of printers that is selectable from the general-purpose print program 41 or the OS 21, displays the list of printers, and receives a printer selection instruction by the user. In this embodiment, the case where the printer 2 is selected will be described.

When the editing application 43 receives a detailed setting instruction from the user in a state where the printer 2 is selected (arrow C), the editing application 43 requests the general-purpose print program 41 to provide detailed setting information on the printer 2 arrow D), When the selected device is the printer 2, the general-purpose print program 41 causes the auxiliary program 42 to operate because the auxiliary program 42 corresponding to the printer 2 is stored in the memory 12, and outputs a request the auxiliary program 42 to provide UI data for detailed setting (arrow E).

The auxiliary program 42 provides the general-purpose print program 41 with UI data for the detailed setting related to printing by the printer 2 in response to the provision request (arrow F). This UI data is data required to create a screen that receives an input related to the detailed setting and is data for requesting an input from the user. UI data is an example of an input request. The general-purpose print program 41 passes the received UI data to the editing application 43 (arrow G), The processes of arrow F and arrow G are processes in which the auxiliary program 42 responds to the editing application 43 with UI data and are examples of an input request process. As a result, the editing application 43 causes the UI 20 to display a UI screen for the detailed setting based on the received UI data (arrow H).

The auxiliary program 42 of the present embodiment receives, for example, the setting of the saving mode, which is a mode for saving the colorant, as the detailed setting included in the UI data. The saving mode is a mode in which the usage amount of ink in the case of the printer 2 being an inkjet printer and the usage amount of toner in the case of the printer 2 being a laser printer are smaller than that when the saving mode is not set. Specifically, when the saving mode is set, the PC 1 performs at least one process among the processes of reducing the overall image density, thinning out the data of the colored portion from the image data, and thinning the line image in the image. The general-purpose print program 41 may or may not support the saving mode, but in the present embodiment, the general-purpose print program 41 does not support the saving mode.

The editing application 43 receives a user's selection instruction on the displayed UI screen (arrow I) and adds the information indicated by the received selection to the print settings. For example, when the received selection instruction is a saving mode setting instruction, the editing application 43 adds information indicating the saving mode setting to the print settings.

Further, when the editing application 43 receives a print execution instruction input by the user via the UI 20 (arrow J), the editing application 43 passes a print execution notification that indicates usage of the general-purpose print program 41 to the OS 21. The print execution notification includes various information including print settings. When the OS 21 receives the print execution notification that indicate usage of the general-purpose print program 41, the OS 21 executes the general-purpose print program 41 and passes the print instruction and various information included in the print execution notification to the general-purpose print program 41 (arrow K).

The general-purpose print program 41 is capable of acquiring various information included in the received print instruction, for example, information indicating a printer to print, information indicating print settings, and information indicating image data to be printed. The information indicating the print settings passed to the general-purpose print program 41 includes not only general print setting information but also information about the detailed selling received on the UI screen displayed by arrow H, for example, information about a saving mode. The general-purpose print program 41 may not support all the print setting information passed.

The general-purpose print program 41 generates the intermediate image data by converting the format of the image data included in the received print instruction into the format of the intermediate image data and generates the print job including the intermediate image data (arrow L). The image data included in the editing application 43 is of various types and the general-purpose print program 41 converts the received image data into intermediate image data suitable for generating print data. If the image data included in the print instruction is data suitable for generating print data, the generation of intermediate image data may be omitted and the image data may be used as intermediate image data as it is. The intermediate image data is, for example, XPS data.

The general-purpose print program 41 may cause the auxiliary program 42 to operate before generating the intermediate image data. The auxiliary program 42 may receive, for example, the information indicating the print settings included in the print instruction from the general-purpose print program 41, edit a part of the information, and return the edited information to the general-purpose print program 41.

The general-purpose print program 41 passes the generated intermediate image data and print settings to the auxiliary program 42 (arrow M). The print settings passed to the auxiliary program in arrow M may be all the information of the print settings received by the general-purpose print program 41 in arrow K, or may be only the information not supported by the general-purpose print program 41.

For example, when the saving mode is set on the UI screen of the detailed setting, the auxiliary program 42 receives information indicating that the saving mode is set together with the intermediate image data in arrow M. When the auxiliary program 42 receives the intermediate image data to which the information that the saving mode is set is added, the auxiliary program 42 adjusts the received intermediate image data into an image in the saving mode (arrow N). The process of arrow N is an example of an intermediate adjustment process.

Specifically, when the saving mode is set, the auxiliary program 42 reduces the overall image density of the intermediate image data, for example. The adjustment process for changing the image density is easy to perform on the intermediate image data and if the intermediate image data is adjusted, the adjustment process is performed in a shorter time as compared with the case of adjusting the print data that is the data after rasterization.

Further, the auxiliary program 42 executes rasterization based on the adjusted intermediate image data to generate print data (arrow O). The process of arrow O is an example of a generation process. When the saving mode is set, the print data with the reduced image density is generated based on the intermediate image data with the reduced image density.

The print data generated by the auxiliary program 42 is data in a format that is capable of being used for printing on the printer 2, and is, for example, PDL data dedicated to the model of the printer 2. By rasterizing the intermediate image data with the auxiliary program 42 corresponding to the printer, the degree of freedom is greater than in the case of rasterizing the intermediate image data with the general-purpose print program 41, and print data suitable fir printing with the printer 2 is likely to be generated. The print data generated by arrow O may be data in a format that is capable of being used for printing on a printer other than the model of the printer 2.

Further, the auxiliary program 42 transmits the generated print data together with a print execution command to the printer 2 (arrow P). The process of arrow P is an example of an output process. The printer 2, which has received the print data and the print execution command, executes printing based on the received print data.

When the saving mode is set, the print data received by the printer 2 is the print data of the image with the reduced image density, and thus, the amount of the colorant used by the printer 2 is less as compared with the case where the saving mode is not set.

The auxiliary program 42 may pass the adjusted intermediate image data to the general-purpose print program 41 in arrow N and the general-purpose print program 41 may perform the generation and transmission of the print data. In that case, the auxiliary program 42 causes the general-purpose print program 41 to rasterize the adjusted intermediate image data received from the auxiliary program 42 to generate print data and to transmit the generated print data to the printer 2. Even in this case, when the saving mode is set, the print data of the image with the reduced image density is transmitted to the printer 2. In this case, the process of passing the adjusted intermediate image data to the general-purpose print program 41 is a part of the processes causing the PC 1 to transmit the print data to the printer 2 and is an example of the output process.

The rasterizing process by the general-purpose print program 41 is different from the rasterizing process by the auxiliary program. The print data generated by the general-purpose print program 41 is print data in a format that is used for printing on various printers, and is, for example, PWGRaster data or PDF data. If rasterization is performed by the general-purpose print program 41, the amount of processing by the auxiliary program 42 is small and the design burden of the auxiliary program 42 is reduced.

Figure 3:
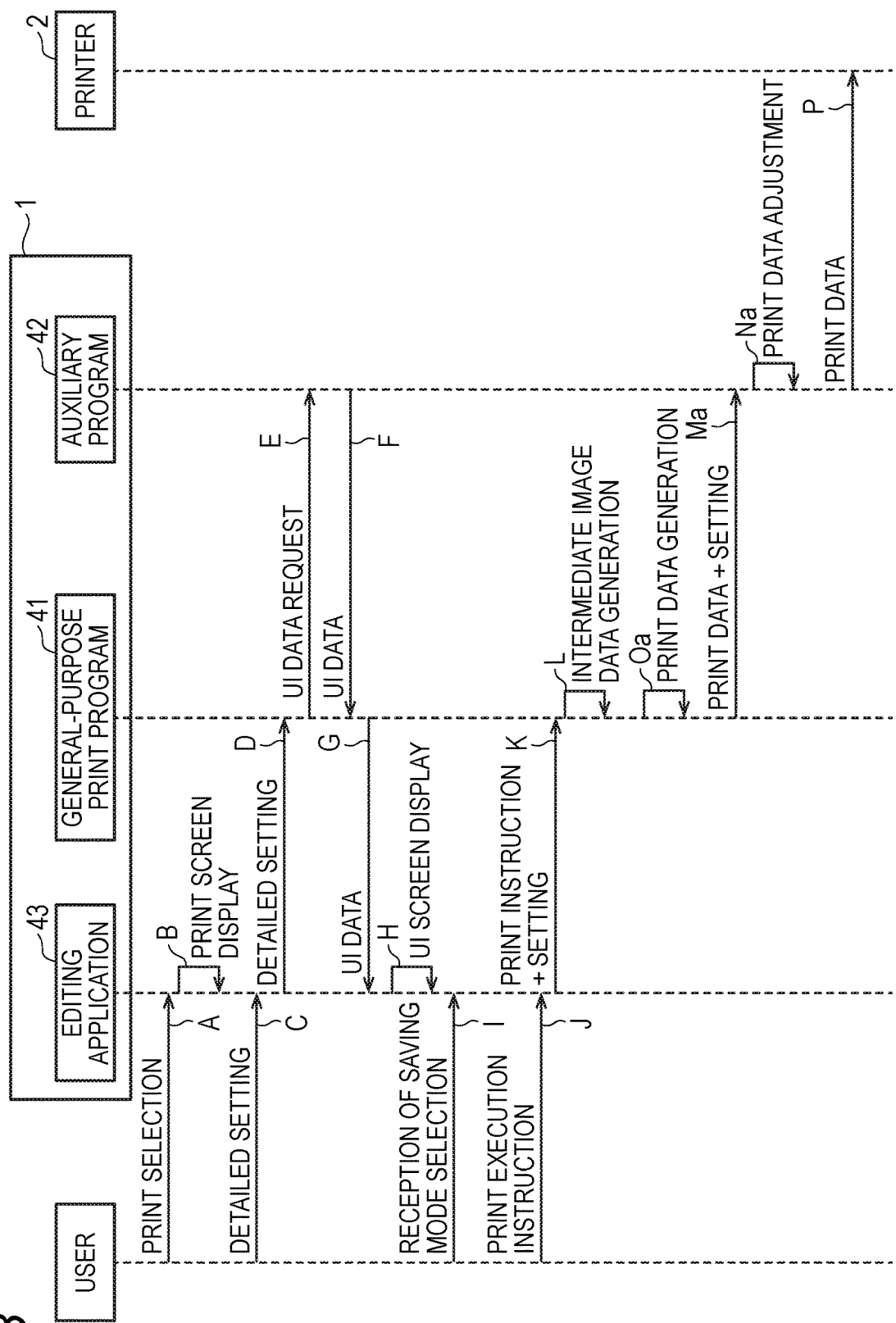
FIG. 3 is a sequence diagram illustrating an example of the procedure of the operation by each program in a modification.

Although the intermediate image data is adjusted by the auxiliary program 42 in the above-described embodiment shown in FIG. 2, the print data may be adjusted by the auxiliary program 42 as shown in FIG. 3, for example. In FIG. 3, the operations from arrow A to arrow L are the same as that in FIG. 2 and are given the same reference numeral as those in FIG. 2, and the portion after arrow L is different from the operation in FIG. 2. In FIG. 3, the portions different from those in FIG. 2 are indicated by adding lowercase subscripts to the reference numerals of the similar operations in FIG. 2.

In the example of FIG. 3, the general-purpose print program 41 generates intermediate image data in arrow L and then rasterizes the generated intermediate image data to generate print data (arrow Oa). The general-purpose print program 41 adds print setting information to the generated print data and passes the print data to the auxiliary program 42 (arrow Ma). The auxiliary program 42 performs image processing on the received print data based on the print setting information (arrow Na). The process of arrow Na is an example of the adjustment generation process.

When the print setting information received in arrow Ma includes the saving mode setting, the auxiliary program 42 performs, for example, at least one of thinning dots at a predetermined interval from a position where dots of the same color are continuous and reducing the line width of the line image, in the image processing of arrow Na for the received print data. Even in this case, the number of colored dots in the print data is reduced, and thus, the amount of the colorant used in the printer 2 is reduced.

Also in the example of adjusting the print data, the auxiliary program 42 may generate the print data instead of the general-purpose print program 41 generating the print data. For example, the auxiliary program 42 may receive the intermediate image data in arrow M in FIG. 2 and then perform the print data generation and the image processing of the print data. The auxiliary program 42 may sequentially perform the print data generation and the image processing of the print data or may perform the image processing based on the print settings in parallel with the print data generation. That is, when the print setting information received in arrow M includes the saving mode setting, the auxiliary program 42 generates print data with a small usage amount of the colorant based on the intermediate image data.

The auxiliary program 42 transmits the adjusted print data to the printer 2 (arrow P). Alternatively, the auxiliary program 42 may pass the adjusted print data to the general-purpose print program 41 and the general-purpose print program 41 may transmit the print data to the printer 2.

As described above in detail, according to the auxiliary program 42 of the present embodiment, when the print instruction in which the saving mode is set is received, the intermediate image data is adjusted to reduce the density, or the printed data is adjusted to reduce the number of dots to be colored. Therefore, since the print data transmitted to the printer 2 is the print data of the image in which the usage amount of the colorant is reduced, even if the general-purpose print program 41 does not support the saving mode, it is possible to save the colorant in the printer 2.

Figure 4:
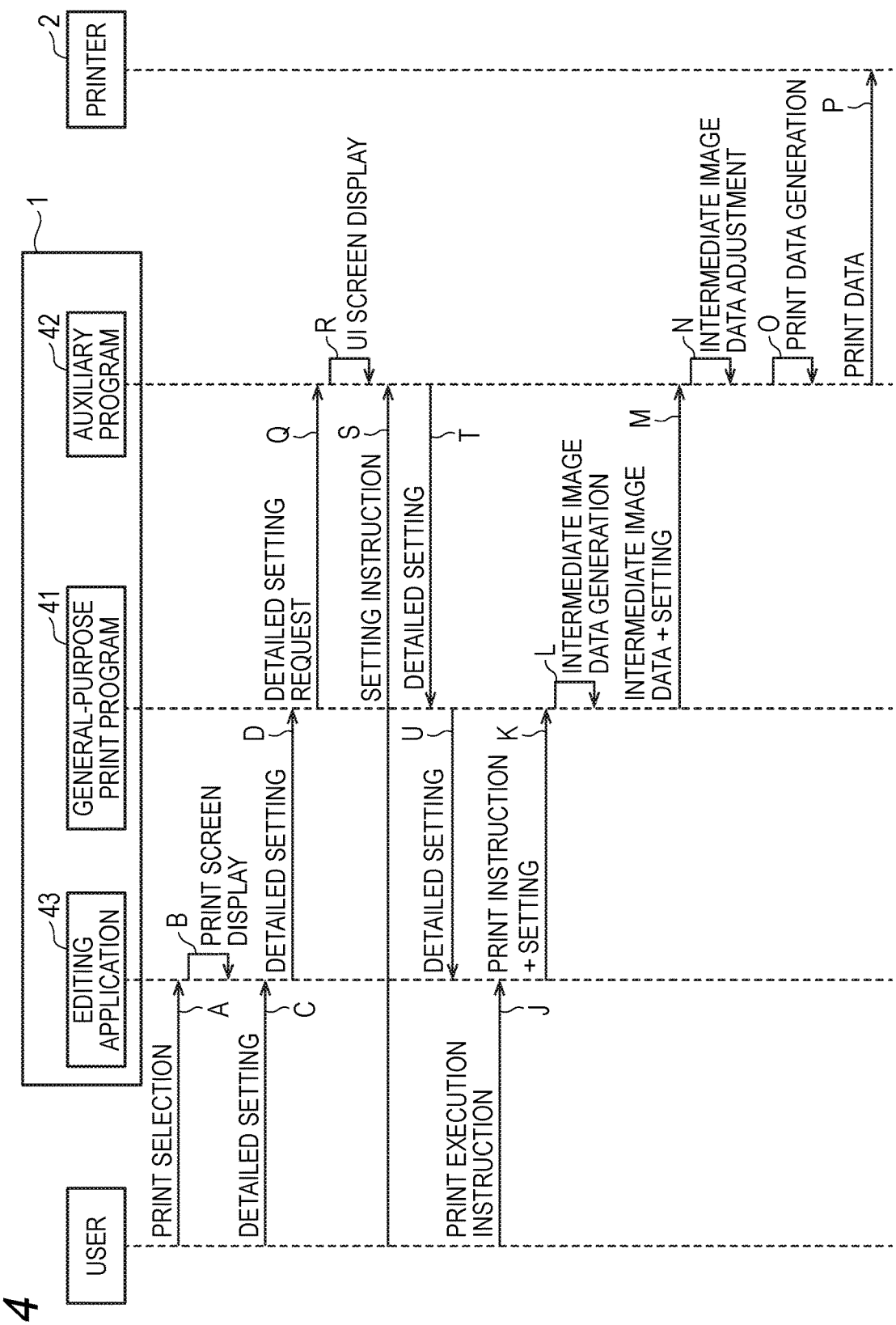
FIG. 4 is a sequence diagram illustrating an example of the procedure of the operation by each program in a second embodiment.

Next, the printing procedure including the operation of the auxiliary program 42 of the second embodiment will be described with reference to the sequence diagram of FIG. 4. The present embodiment is different from the first embodiment in the procedure for receiving the detailed setting instruction. In FIG. 4 and the following description, the same processes as those in the first embodiment are designated by the same reference numerals and the description thereof will be omitted.

In this embodiment, first, the same processes as arrow A to arrow D as in the first embodiment are executed. That is, when printing is selected, the editing application 43 displays a print screen and receives a detailed setting instruction. Upon receiving the detailed setting instruction via the editing application 43, the general-purpose print program 41 operates the auxiliary program 42 and outputs a detailed setting information request to the auxiliary program 42 (arrow Q).

In arrow Q, the general-purpose print program 41 requests the setting information, not the UI data, unlike arrow F in FIG. 2.

Upon receiving the detailed setting information request, the auxiliary program 42 causes the UI 20 to display a UI screen for receiving the detailed setting (arrow R). The UI screen displayed by arrow R includes, for example, a selection button for receiving the setting of the saving mode. The auxiliary program 42 receives a user's instruction input on the displayed UI screen (arrow S).

When the auxiliary program 42 receives a detailed setting end instruction from the user on the displayed UI screen, the auxiliary program 42 passes the selection result, which is the information of various detailed settings selected at that time as a response to the request of arrow Q to the general-purpose print program 41 (arrow T). The general-purpose print program 41 passes the selection result received from the auxiliary program 42 to the editing application 43 (arrow U). The processes of arrow T and arrow U are processes in which the auxiliary program 42 responds to the editing application 43 with the selection result and are examples of a selection receiving process. If the memory 12 has a storage area that can be commonly used by the auxiliary program 42 and the editing application 43, the auxiliary program 42 may store the detailed setting information in the storage area instead of passing the detailed setting information to the general-purpose print program 41.

When the editing application 43 receives a print execution instruction input from the user in arrow J, the editing application 43 passes a print execution notification including the print setting added with the detailed setting set by the auxiliary program 42 to the OS 21. The subsequent processes are the same as in the first embodiment.

Figure 5:
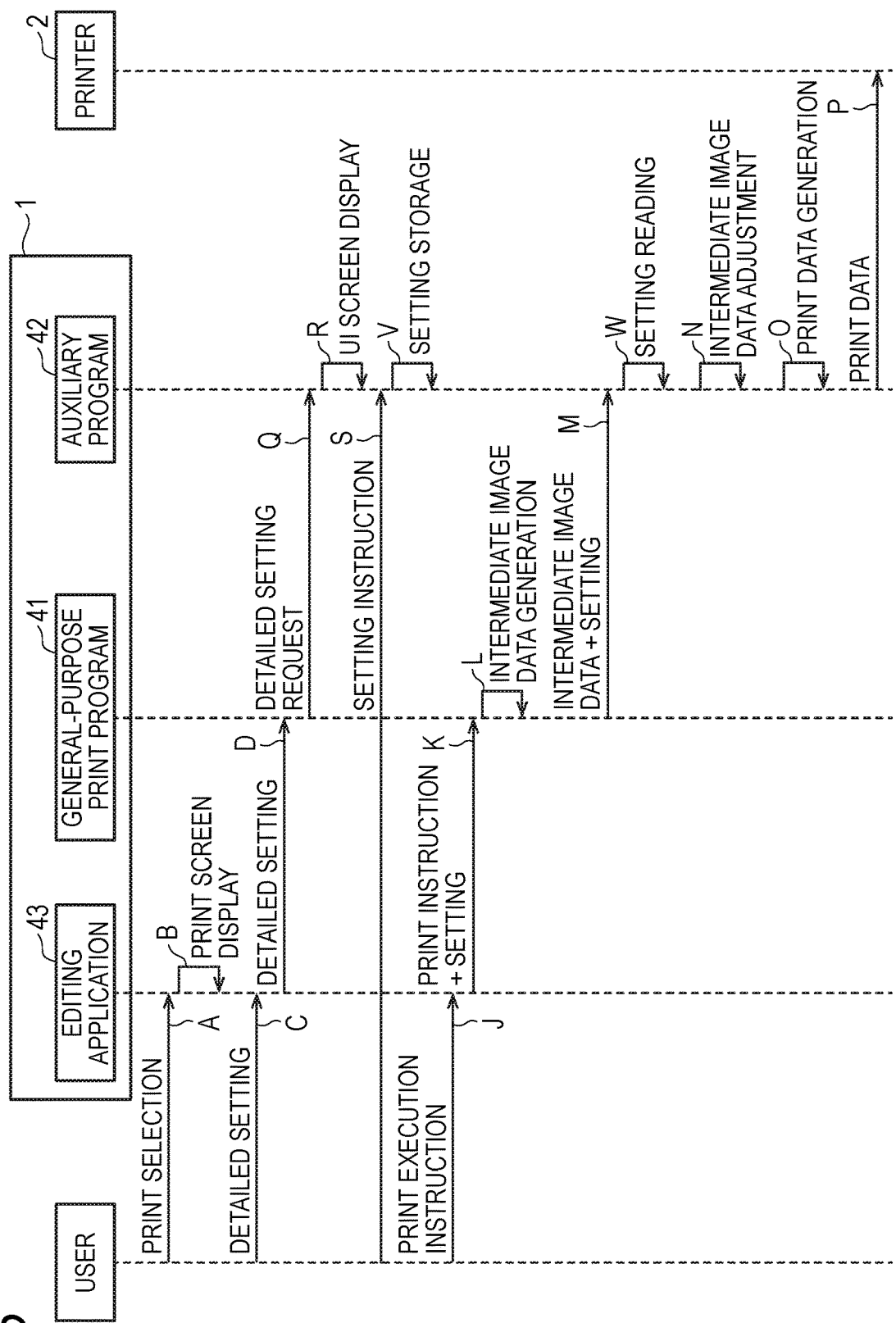
FIG. 5 is a sequence diagram illustrating an example of the procedure of the operation by each program in a modification of the second embodiment.

In the present embodiment, for example, as shown in FIG. 5, the detailed setting information may be stored in the auxiliary program 42 instead of being returned to the editing application 43. That is, the auxiliary program 42 receives the setting instruction from the user on the UI screen for receiving the detailed setting (arrow S), and stores the received detailed setting information in the area of the memory 12 that the auxiliary program 42 itself can use (arrow V). In this case, the auxiliary program 42 may store the detailed setting information in association with the information of the editing application 43 that has requested the detailed setting, for example.

After that, when the auxiliary program 42 receives the intermediate image data based on the print command from the editing application 43 from the general-purpose print program 41 (arrow M), the detailed setting information stored in association with the editing application 43 is read from the memory 12 (arrow W). If the read detailed setting information includes the information indicating that the saving mode is selected, the auxiliary program 42 adjusts the intermediate image data or the print data to generate the print data of the image for saving the colorant.

As described above in detail, even in the auxiliary program 42 of the second embodiment, as in the first embodiment, when the print instruction in which the saving mode is set is received, the print data of the image in which the usage amount of the colorant is reduced is generated. Therefore, since the print data received by the printer 2 is the print data of the image in which the usage amount of the colorant is reduced, even if the general-purpose print program 41 does not support the saving mode, the amount of the colorant used by the printer 2 is small.

Next, the printing procedure including the operation of the auxiliary program 42 of a third embodiment will be described with reference to the sequence diagrams of FIGS. 6 and 7. This embodiment is different from the first and second embodiments in the procedure for receiving the designation of the saving mode. Before receiving the print instruction, the auxiliary program 42 of the present embodiment receives the setting of the saving mode as the setting of the printer 2 in the procedure shown in FIG. 6.

Figure 6:
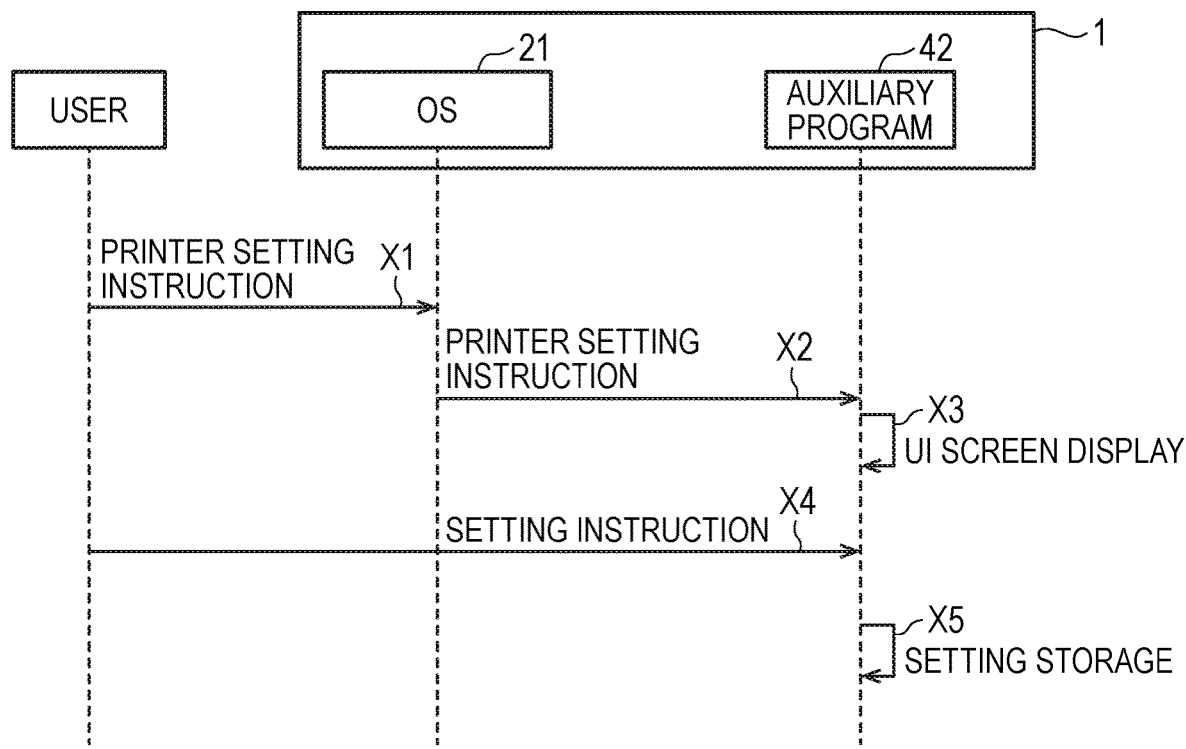
FIG. 6 is a sequence diagram illustrating an example of the procedure of the operation by each program in a third embodiment.
Figure 7:
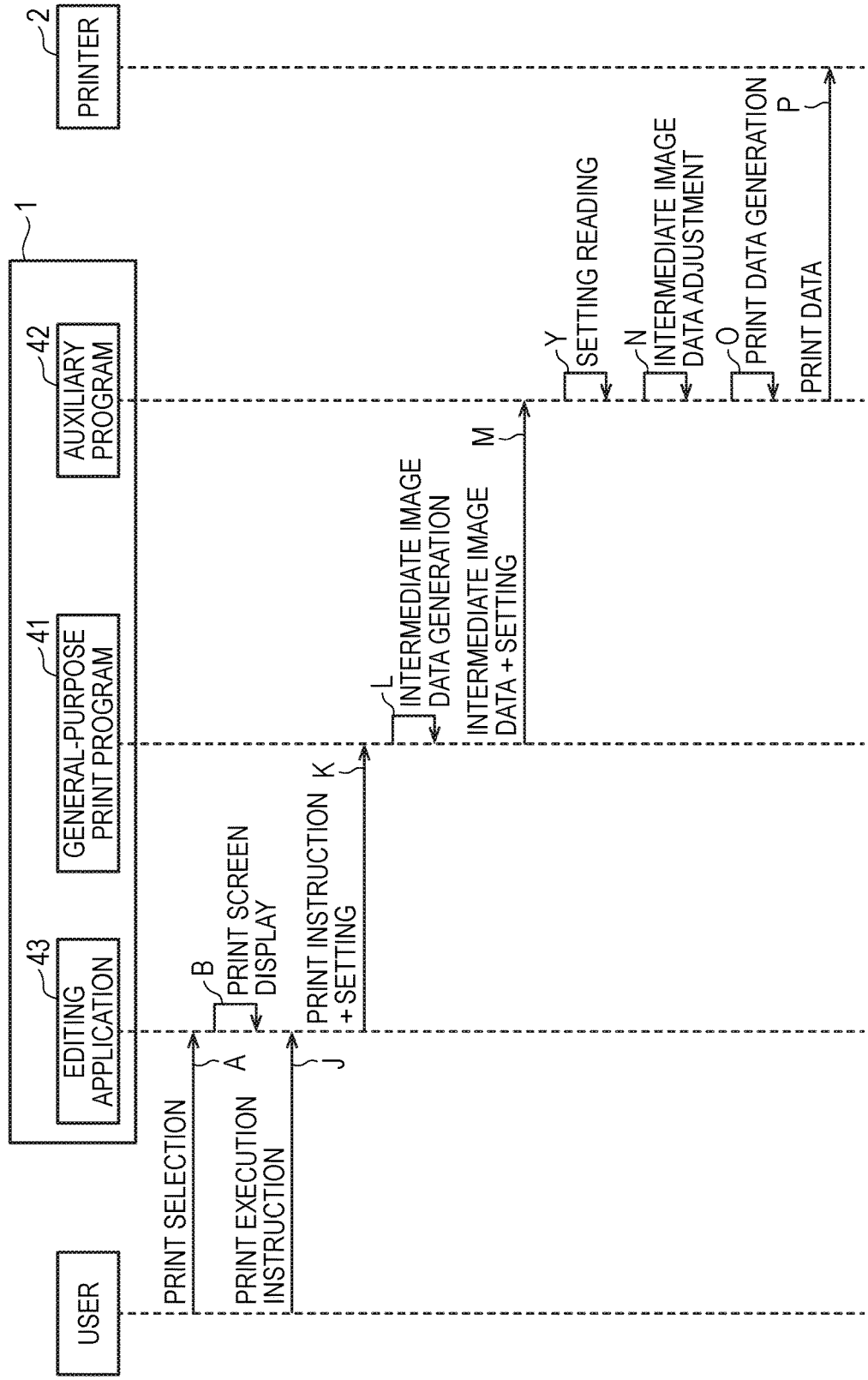
FIG. 7 is a sequence diagram illustrating an example of the procedure of the operation by each program in the third embodiment.

In the present embodiment, as shown in FIG. 6, the OS 21 receives a setting instruction of printer setting information based on a user's instruction (arrow X1). The OS 21 can receive the designation of a printer and the instruction to set the printer setting information for the designated printer at a timing irrelevant to the print instruction. The printer setting information is the information used as default settings when the printer is selected by a subsequent print command or the like.

In FIG. 6, a case where the printer 2 is designated will be described. Since the designated printer is the printer 2, the OS 21 causes the auxiliary program 42 corresponding to the printer 2 to be executed and passes a setting instruction of printer setting information to the auxiliary program 42 (arrow X2).

Upon receiving the setting instruction of the printer setting information, the auxiliary, program 42 displays the UI screen for receiving the instruction input of the printer setting information on the UI 20 (arrow X3). The auxiliary program 42 receives various settings including the setting of the saving mode on this UI screen (arrow X4). The process of arrow X4 is an example of a reception process.

The auxiliary program 42 stores the received printer setting information in the memory 12 (arrow X5). The process of arrow X5 is an example of a storage process. When the auxiliary program 42 corresponds to a plurality of printers, the auxiliary program 42 may store the printer setting information in association with the information for identifying the printer 2.

Next, while the printer setting information is stored in advance in the procedure of FIG. 6, the procedure when the editing application 43 receives an instruction to print in the printer 2 will be described with reference to the sequence diagram of FIG. 7. In FIG. 7 and the following description, the same processes as those in the first embodiment are designated by the same reference numerals and the description thereof will be omitted.

Also in this embodiment, the processes of arrow A to arrow B are executed as in the first embodiment. When printing is selected, the editing application 43 displays a print screen and receives a user's instruction. When the editing application 43 receives the print execution instruction input by arrow J, the processes of the arrow J to arrow M are executed. That is, the editing application 43 generates a print execution notification including print settings and passes the generated print execution notification to the OS 21, and the general-purpose print program 41 that has received the print execution notification from the OS 21 generates intermediate image data and passes the intermediate image data to the auxiliary program 42. In this embodiment, the detailed setting instruction is not received.

In response to receiving the intermediate image data from the general-purpose print program 41, the auxiliary program 42 reads the printer setting information stored in the memory 12 (arrow Y), The printer setting information includes information related to the saving mode setting by the operation shown in FIG. 6. If the saving mode is set in the printer setting information, the auxiliary program 42 executes the same process as in the case where the saving mode is set as the detailed setting.

The subsequent processes are the same as in the first embodiment. If the printer setting information includes the saving mode setting, the auxiliary program 42 adjusts the intermediate image data or the print data to generate the print data of the image for saving the colorant and transmits the print data to the printer 2. By receiving the saving mode setting in advance as the printer setting information, it is possible to save the user's burden of setting each time printing is performed. On the other hand, as shown in the first and second embodiments, if the setting of the saving mode is received at the time of printing, the user's selection can be received for each job.

Also, in this embodiment, a detailed setting instruction may be received. When the detailed setting instruction is received, for example, the auxiliary program 42 is executed as shown in FIG. 2, In this case, the auxiliary program 42 may read the printer setting information and return the UI data in which the setting based on the printer setting information is set as the default setting.

As described above in detail, even in the auxiliary program 42 of the third embodiment, as in the first and second embodiments, the print instruction in which the saving mode is set is received, the print data of the image in which the usage amount of the colorant is reduced is generated. Therefore, since the print data received by the printer 2 is the print data of the image in which the usage amount of the colorant is reduced, even if the general-purpose print program 41 does not support the saving mode, the amount of the colorant used by the printer 2 is small.

In each of the above-described embodiments, the print data to be transmitted to the printer 2 is the print data of the image in which the usage amount of the colorant is reduced, so that the amount of the colorant used by the printer 2 is saved. However, if the printer 2 has a mode for saving the colorant in its own device, the usage amount of the colorant in the printer 2 is reduced even when a saving command for instructing to print in this mode is transmitted to printer 2. For example, some laser printers have a model having a function of temporarily changing the developing bias or the charging bias in the direction of reducing the amount of toner to be developed when a saving command is received.

Therefore, the auxiliary program 42 may determine whether or not the printer selected as the device that executes printing is a model that has a mode for saving the colorant in its own device and determine whether or not to transmit a saving command to the printer. For example, when the auxiliary program 42 determines that the printer is a model having the mode, the auxiliary program 42 may also transmit a saving command when transmitting the print data in arrow P in each drawing. In addition to the adjustment of the image, the printer can perform the processing corresponding to the saving mode, and thus, the saving of the colorant can be further expected. On the other hand, by not transmitting the saving command to the printer of the model that does not support the saving command, useless processing can be avoided.

The saving command may be transmitted by the auxiliary program 42 before transmitting the print data or may be added to the print data and transmitted from the auxiliary program 42 or the general-purpose print program 41. Further, the auxiliary program 42 corresponding to the printer corresponding to the saving command may transmit the print data to which the saving command is added instead of performing the image adjustment described in each embodiment.

The embodiments disclosed in the present specification are merely examples and do not limit the present invention. Therefore, the technology disclosed in the present specification can be variously modified and changed without departing from the gist of the invention. For example, the device connected to the PC 1 is not limited to the printer and may be any other device having a printing function including a multifunction peripheral, a copying machine, a FAX device, and the like. Further, the number of printers connected to the PC 1 is not limited to the illustrated example and may be two or more.

Further, in the embodiment, as the saving mode, only selection of setting or non-setting is received hut there may be a gradual saving mode. For example, as a parameter of the saving mode, it may be allowed to set a value indicating a degree of reducing the usage amount of the colorant.

Further, in the embodiments, when the saving mode is set, the intermediate image data or the print data is adjusted but both may be adjusted. That is, for example, with respect to the print data generated by rasterizing based on the adjusted intermediate image data of arrow N in FIG. 2, image processing to save the colorant indicated by arrow Na of FIG. 3 may be further performed.

Further, in the embodiment, as the operation of the auxiliary program 42, only the operation of setting the saving mode in the print setting is described in detail but the auxiliary program 42 may have another role. The module that executes the operation of setting the saving mode in the print setting is not limited to the auxiliary program 42 and may be any program that receives an instruction from the OS 21 or the general-purpose print program 41 when performing printing using the general-purpose print program 41. For example, a print workflow application (Print workflow) published by Microsoft Corporation may be used.

Also, the execution timing of the auxiliary program 42 is not limited to the example of the embodiment. For example, the execution may be directly instructed from the OS 21 and executed, or the resident auxiliary program 42 may be used. When resident, the auxiliary program 42 may receive an execution command and perform the above-described operation.

Further, in any flowchart disclosed in the embodiments, the plurality of processes in any of the plurality of steps can be arbitrarily changed in execution order or executed in parallel within a range in which there is no contradiction in processing contents.

Further, the processing disclosed in the embodiments may be executed by hardware including a single CPU, a plurality of CPUs, or ASIC, or a combination thereof. Further, the processing disclosed in the embodiments can be realized in various modes including a recording medium recording a program for executing the processing, a method, or the like.

What is claimed is:

1. A non-transitory computer readable medium storing a support application program causing a computer installed an information processing device to execute a process for supporting a printer connected to the information processing device, the process comprising:
   in a case where a print instruction causing the printer to print an image is sent to a general-purpose print program of an operating system of the information processing device, and in a job based on the print instruction, a saving mode for reducing a usage amount of a colorant is selected,
      acquiring intermediate image data corresponding to the image to be printed according to the print instruction from the general-purpose print program of the operating system, the intermediate image data being generated with a format which the general-purpose print program of the operating system complies with;
      performing an adjustment for reducing a usage amount of colorant for the intermediate image data acquired from the general-purpose print program of the operating system and having the format which the general-purpose print program of the operating system complies with;

generating print data by rasterizing the adjusted intermediate image data adjusted by the support application program; and outputting the generated print data so that the print data generated by the support application program is transmitted from the information processing device to the printer.

2. The non-transitory computer readable medium according to claim 1, wherein the process further comprises:

in response to a request from an application program installed in the information processing device, receiving selection information on whether or not the saving mode is selected via a user interface of the information processing device; and passing the received selection information to the application program as a response to the request, the selection information is included in the print instruction sent from the application program, and the computer executes the acquiring and the adjustment in a case where, when receiving the print instruction, the print instruction includes the selection information indicating that the saving mode is selected.

3. The non-transitory computer readable medium according to claim 1, wherein the process further comprises:

in response to a request from an application program installed in the information processing device, passing an input request of selection information on whether or not the saving mode is selected to the application program, when the input request is received by the application program, the application program receives the selection information via a user interface of the information processing device and includes the selection information in the print instruction, the computer executes the acquiring and the adjustment in a case where when receiving the print instruction, the print instruction includes the selection information indicating that the saving mode is selected.

4. The non-transitory computer readable medium according to claim 1, wherein the process further comprises:

receiving selection information on whether or not the saving mode is selected via a user interface of the information processing device; and storing the selection information received in the receiving in a memory of the information processing device, and the computer executes the acquiring and the adjustment in a case where when receiving the print instruction, the selection information indicating that the saving mode is selected is stored in the memory.

5. The non-transitory computer readable medium according to claim 1, wherein in the transmitting of the print data by the information processing device, the print data transmitted to the printer is accompanied with a command of an instruction for saving the colorant.

6. The non-transitory computer readable medium according to claim 5, wherein in the transmitting of the print data by the information processing device, whether or not to transmit the command to the printer is determined according to a model of the printer which is a destination of the print data.

7. An information processing device comprising a computer, wherein an operating system of the information processing device includes a general-purpose print program, a support application program available for printing using a printer connected to the information processing device is installed in the information processing device, and the computer executes:

in a case where a print instruction causing the printer to print an image is output to the general-purpose print program, and in a job based on the print instruction, a saving mode for reducing usage amount of a colorant is selected, acquiring process of acquiring intermediate image data corresponding to the image to be printed according to the print instruction from the general-purpose print program, the intermediate image data being generated which a format which the general-purpose print program of the operating system complies with;

an intermediate adjustment process of performing an adjustment for reducing the usage amount of the colorant for the intermediate image data acquired from the general-purpose print program of the operating system and having the format which the general-purpose print program of the operating system complies with;

a generating process of generating print data by rasterizing the adjusted intermediate image data adjusted by the support application program; and an output process in which the support application program causes the information processing device to transmit the generated print data generated by the support application program to the printer.

8. A printing method of causing a printer to perform printing based on print data generated by an information processing device to which the printer is connected, the information processing device including:

an operating system including a general-purpose print program; and a support application program available for printing using the printer and installed in the information processing device, the printing method comprising:

in a case where a print instruction causing the printer to print an image is sent to the general-purpose print program, and in a job based on the print instruction, a saving mode for reducing a usage amount of a colorant is selected, acquiring intermediate image data corresponding to the image to be printed according to the print instruction from the general-purpose print program, the intermediate image data being generated with a format which the general-purpose print program of the operating system complies with;

performing an adjustment for reducing the usage amount of the colorant for the intermediate image data acquired from the general-purpose print program of the operating system and having the format which the general-purpose print program of the operating system complies with;

generating print data by rasterizing the adjusted intermediate image data adjusted by the support application program; and outputting the generated print data so that the print data generated by the support application program is transmitted from the information processing device to the printer.

* * * * *